Nov. 29, 1938.  O. RASMUSSEN ET AL  2,138,205
INTERNAL BRAKE
Filed Feb. 24, 1936  4 Sheets-Sheet 4

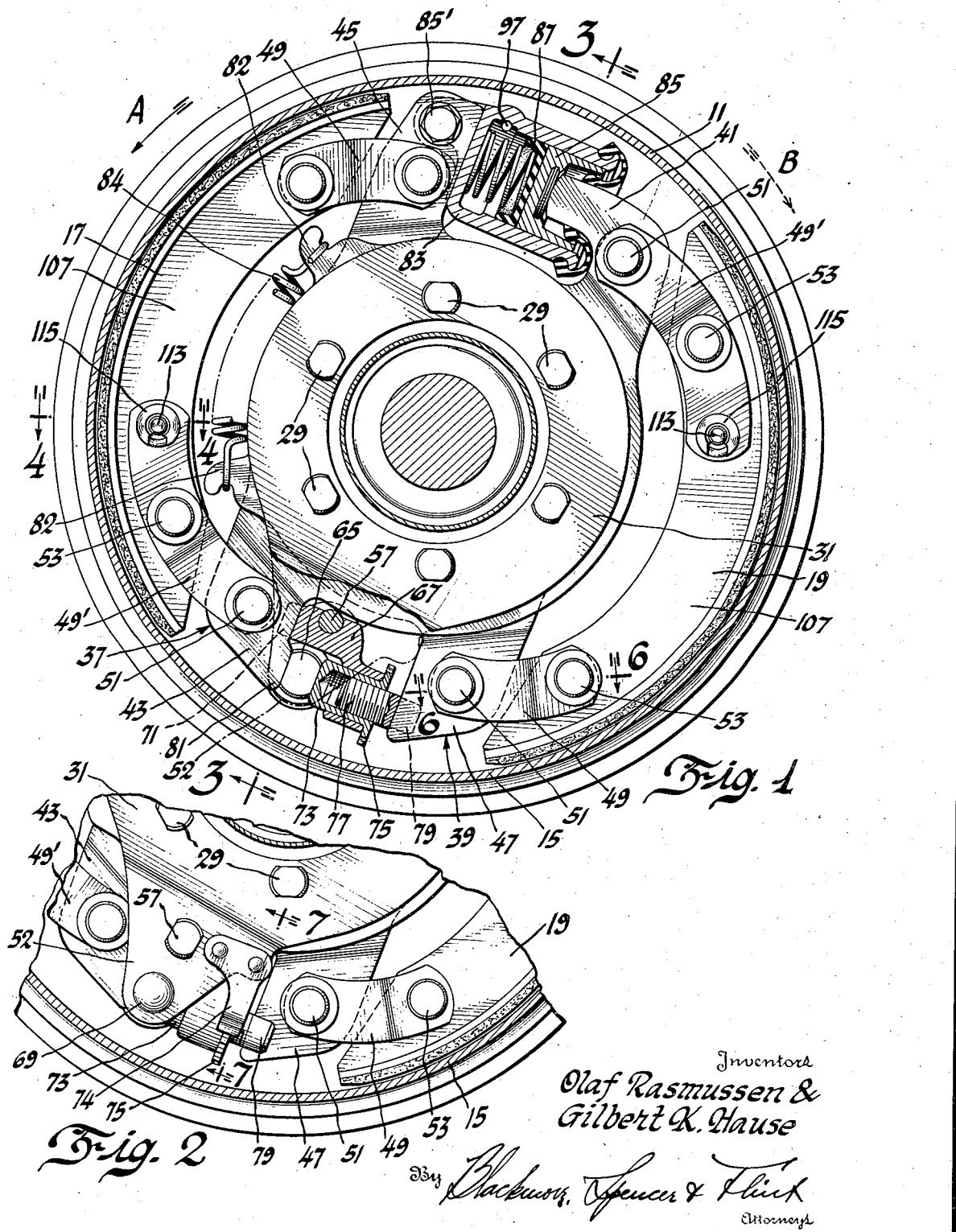

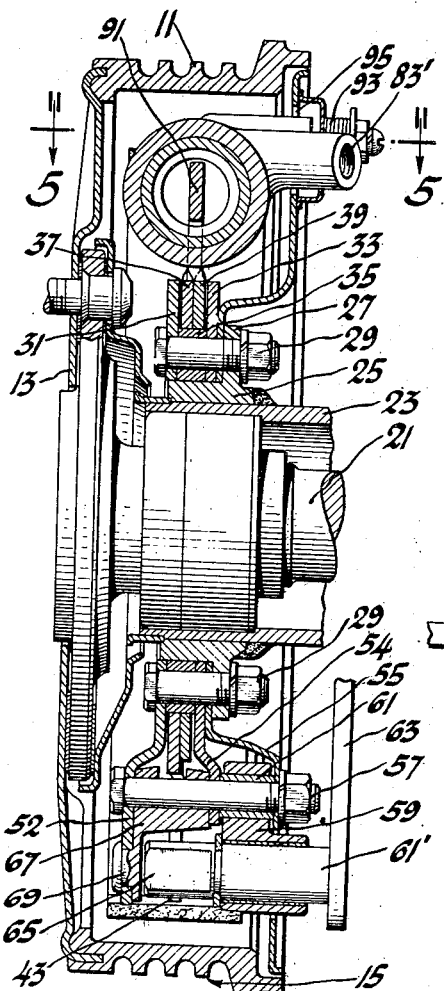

Inventors
Olaf Rasmussen &
Gilbert K. Hause
By Blackmore, Ismen & Flint
Attorneys Patented Nov. 29, 1938

2,138,205

UNITED STATES PATENT OFFICE 2,138,205

INTERNAL BRAKE

Olaf Rasmussen and Gilbert K. Hause, Dayton, Ohio, assignors to General Motors Corporation, Detroit, Mich., a corporation of Delaware Application February 24, 1936, Serial No. 65,227

14 Claims. (Cl. 188—152)

This invention relates to brakes and has been designed to provide an internal brake for use on vehicles. It is the object of the invention to make a two-shoe brake wherein both shoes act alike, wherein in checking forward travel the self-energization of each shoe is the same, resulting in an equal amount of work and equal wear in each case. In one embodiment of the invention the function of each shoe is the same for either direction of drum rotation. In another embodiment one shoe only in each drum is self-energizing to check rearward travel. The construction of the complete assembly requires but a single provision of means to adjust for lining wear, which single adjustment is effective for brake application whether by service or by emergency mechanism.

Other objects and advantages will be understood from the following description.

The invention is illustrated by the accompanying drawings in which

Fig. 1 is a transverse section through a rear wheel brake drum showing the shoe assembly in elevation, and also showing a fluid actuator and a shoe anchorage in section.

Fig. 2 is a view in elevation of the anchorage region.

Fig. 3 is a section on line 3—3 of Fig. 1.

Fig. 4 is a section on line 4—4 of Fig. 1.

Fig. 5 is a section on line 5—5 of Fig. 3.

Fig. 6 is a section on line 6—6 of Fig. 1.

Fig. 7 is a section on line 7—7 of Fig. 2.

Figure 8:
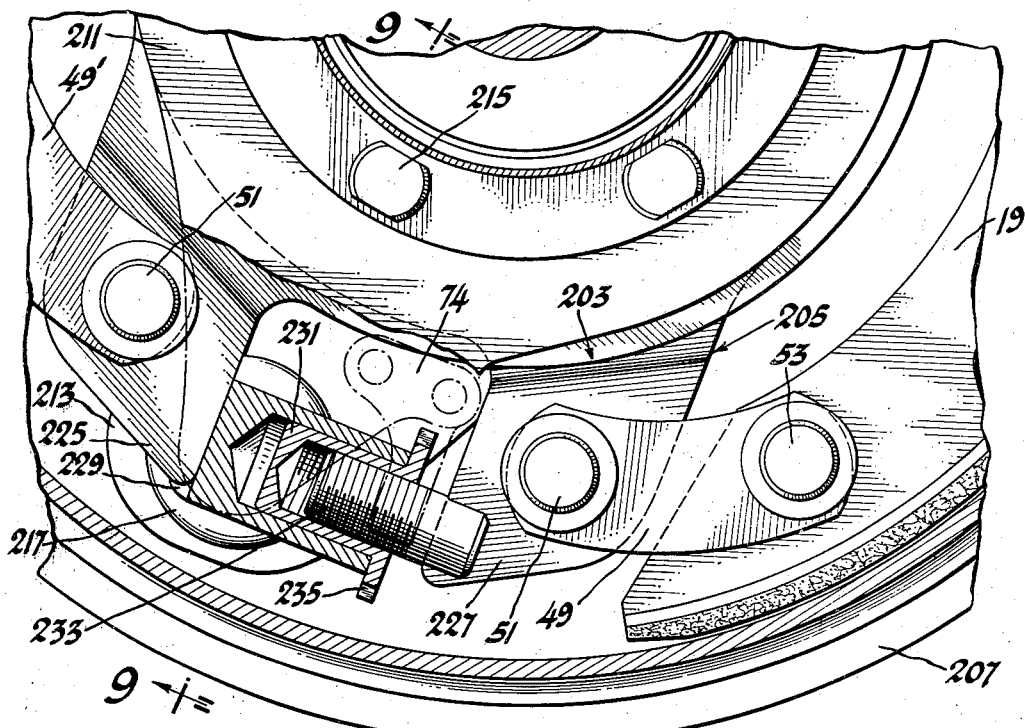
Fig. 8 is a detail, partly in elevation and partly in section, of a front wheel brake assembly.

Referring by reference characters to the drawings, numeral 11 is used to designate an annular brake shoe engaging ring which together with a head 13 constitutes a brake drum 15. Two shoes 17 and 19 are used to frictionally engage the ring 11 and retard the rotation of the drum and the wheel which carries it when the invention is used for the purpose of a wheel brake.

In Fig. 3 live axle 21 is surrounded by an axle housing 23. A hub ring 25 is secured to the housing 23 and is formed with a radial flange 27. A plurality of bolts 29 extend through this flange and secure thereto fixed plates 31 and 33 and a spacing ring 35 between said plates. Rotatable upon the spacing ring 35 and between plates 31 and 33 are rotatable plates 37 and 39. Plate 37 has radially extended arms 41 and 43 positioned diametrically opposite each other as shown by Fig. 1. Plate 39 has diametrically opposite radial arms marked on Fig. 1 by numerals 45 and 47.

As shown in Fig. 6, a pair of links 49 are connected to arm 47 and to the adjacent end of shoe 19 by pins 51 and 53. Similar links also marked 49 connect arm 45 with the adjacent end of shoe 17. Links 49' are used to connect the other end of shoe 17 to arm 43, and the other end of shoe 19 to arm 41. These links 49' are longer than links 49. They extend beyond the pivot pins 53 along the shoe web 107 (see Fig. 4). Extending through apertures in the ends of links 49' and through an enlarged opening 109 in the shoe web is a pin 111 having heads 113 serving to hold abutments 115 for springs 117, which springs engage the links 49' whereby friction between the said links and the shoe web resists relative movement.

Fixed plate 31 has a projection 52, which projection is deflected from the plane of the plate as shown by Fig. 3. Fixed plate 33 has an oppositely deflected part 54. The bolt 29 at the region of these deflected projections also passes through a cover plate 55 which is deflected from projection 54 as shown. A bolt 57 extends through these several projections. Between projections 54 and 55 is a link 59 rotatable about a ring 61 surrounding the bolt 57. This link 59 rotatably supports at a point spaced from bolt 57 a spindle 61' carrying a cam 65 and, externally, is provided with a crank arm 63. Between projections 52 and 54 is a shoe anchor block 67. It has an opening surrounding the bolt 57 and is held from rotation by an axial extension 69 secured to the projection 52. Near the bolt 57 the anchor block 67 is bifurcated as at 71 and between the furcations the part 43 of plate 37 may engage the block as shown in Fig. 1. Slidable in an aperture of block 67 is an internally threaded cup-shaped nut 73 having a notched flange 75. A screw 77 is threaded into said nut and has furcations 79 between which is adapted to be seated the radial extension 47 of plate 39. The cam 65 is located between the nut 73 and a part 81 of extension 43. The two rotatable plates 37 and 39 have tongues 82 connected by a coil spring 84 whereby they are rotated by spring force into contact with their abutments at 71 and 79.

The brake may be applied by hydraulic means and provision for such application is shown. In Fig. 1 numeral 83 is a cylinder fastened solidly by means of a screw 85'. Fluid under pressure from a master cylinder (not shown) enters at 83' (see Fig. 5). The fluid pressure functions to move piston 85 to the right (Fig. 1), the piston having a sealing cup 87. The piston engages the part 41. This wheel cylinder is not secured to the backing or cover plate 55 but to arm 45 and reacts on arm 41. The backing plate has an opening 95 to accommodate the floating movement by which equalized pressure is applied to the arms 45 and 41. A passage 97 for bleeding air is normally closed by a bleeder screw 100 and a protecting cover 101 for the opening 95 may be used. A screw 99 threadedly received by the bleeder screw seals it against dirt. The cover 101 may be held yieldingly against the cover plate 55 by a spring 93 located between the cover 101 and an abutment 102 rigid with the cylinder.

A single adjustment for both shoes is made by rotating nut 73, this being accomplished by a suitable tool applied to the notched head 75. The backing plate has an opening 103 to afford access to the head 75 and any convenient cover 105 may be used to normally close this opening. A yielding detent 74 secured at 76 to the plate 52 holds the parts in positions of adjustment.

The operation of the brake is as follows: When the brake is in its inactive position, spring 84 rotates the rotatable plates in opposite directions so that arm 47 of plate 39 engages the adjustable stop 79 and arm 43 of plate 37 engages stop 71. When fluid pressure is forced into the chamber of the wheel cylinder 83 between its head and its piston 85 the head tends to move to the left and the piston to the right. Since the cylinder is floating both movements may occur. The counterclockwise movement imparted to plate 39 by the pressure of the cylinder 83 upon its arm 45 pushes the shoe, by means of links 49, outwardly into contact with the drum. Arrow A represents the direction of drum rotation for forward travel. This drum rotation carries shoe 17 around with it. This motion is transmitted through articulating link 49' to arm 43 of plate 37, arm 43 being thus forced against the stop at 71. Thus the fluid braking force applied to shoe 17 is supplemented by the self-energization due to drum rotation to provide an articulated anchorage at 71. These forces holding arm 43 on its anchor at 71 obviously hold arm 41 fixed so that it may be regarded as a supplemental anchorage for shoe 49. Shoe 19 will be seen to be subjected to the same forces. The hydraulically applied force which rotates arm 45 also rotates arm 47 since both arm 45 and 47 are parts of plate 39. This rotation of arm 47 pushes through links 49 upon shoe 19 which is also subject to self-actuation due to drum rotation and it, too, has an articulated anchorage with arm 41. It will be seen that the pressure upon arm 41 is resisted by the engagement of arm 43, rigid with arm 41, upon the anchor block so that a single adjustment at the common anchorage is sufficient for both shoes. If, now, the brake is released, the spring 84 rotates the plates 37 and 39 in opposite directions and the shoes are released from drum contact. In the act of applying the brakes the connections of the longer links 49' permit the shoes to nicely conform to the drum curvature whereby the well-known advantages of the articulated shoe are obtained. There is, however, sufficient friction between the shoe web and the plates 49' to prevent the dragging of the shoe when released. If the wheel and drum are rotating as indicated by arrow B the direction corresponding to reverse vehicle movement, the same efficient brake action occurs, the anchorage in this case being at 77 instead of at 71. For emergency application any convenient means may be used the rock lever 63, shaft 61' and cam 65. The cam tends to spread apart the arms 43 and 47 and the self-actuating force of drum rotation operates as before to make a single anchorage either at 71 or at 77. A single adjustment is sufficient since the mechanical and hydraulic applying means have floating support.

Figure 9:
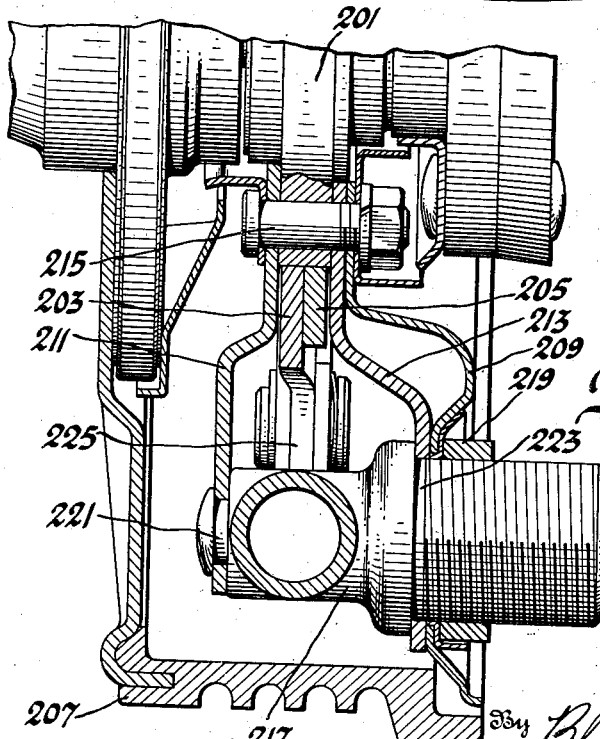
Fig. 9 is a section on line 9—9 of Fig. 8.

Fig. 8 and Fig. 9 show how such a brake may be used on a front wheel in which case provision for operation by the emergency lever is omitted. The axle about which the wheel rotates carries a ring 201 about which are supported for rotation rings 203 and 205. The wheel carried drum is represented by numeral 207 and the cover plate by numeral 209. Two other plates 211 and 213 are mounted on the remote sides of plates 203 and 205, the parts being secured by fastening means 215. A shoe anchor 217 is secured to the cover plate by being passed therethrough and by a nut 219 threaded therein and into engagement with the cover plate. Fixed plates 211 and 213 are spaced apart and engage parts 221 and 223 of the anchor. In this way the anchor is fixedly secured and the anchor serves to keep plates 211 and 213 from rotation. When this device is used for that kind of front wheel suspension using a radius rod, the external portion of the anchor 217 may serve for the attachment of the end of said rod. Radial extensions 225 and 227 on the rotatable plates 203 and 205 correspond with the similar extensions or arms 43 and 47 in the form of the invention shown by Fig. 1. Such arms as 45 and 41 of Fig. 1 are to be used in this second form and the same hydraulic applying means may be used for the shoes connected as before to the plates by links 49 and 49'.

The anchor 217 is formed with lugs 229 between which the arm 225 engages as shown. The anchor is bored out to receive a cup-shaped nut 231 internally threaded to receive a screw 233, the latter being designed for abutment with arm 227. The nut has teeth 235 whereby adjustment may be made as before. It will be observed that in this form of the invention the cam for actuation by the emergency lever is omitted for the reason that it is believed unnecessary to use the front wheel brake for emergency and parking purposes.

In the form of the invention shown by Figs. 10 to 14 both shoes are self-energizing when checking forward travel. When checking rearward travel one only of each pair of shoes is self-energizing. This change permits considerable simplification and reduction of cost.

In this embodiment 301 is the wheel carried drum and 303 is the drum cover plate. The cover plate is carried fixedly by axle housing 305 being secured to a housing flange 307 by a plurality of circumferentially distributed fastening means 309. Also secured to the housing flange 307 by fastening means 309 is a plate 311. Washers 313 surround bolts 309 and hold the plates 303 and 311 in spaced relation.

Figures 10, 11:
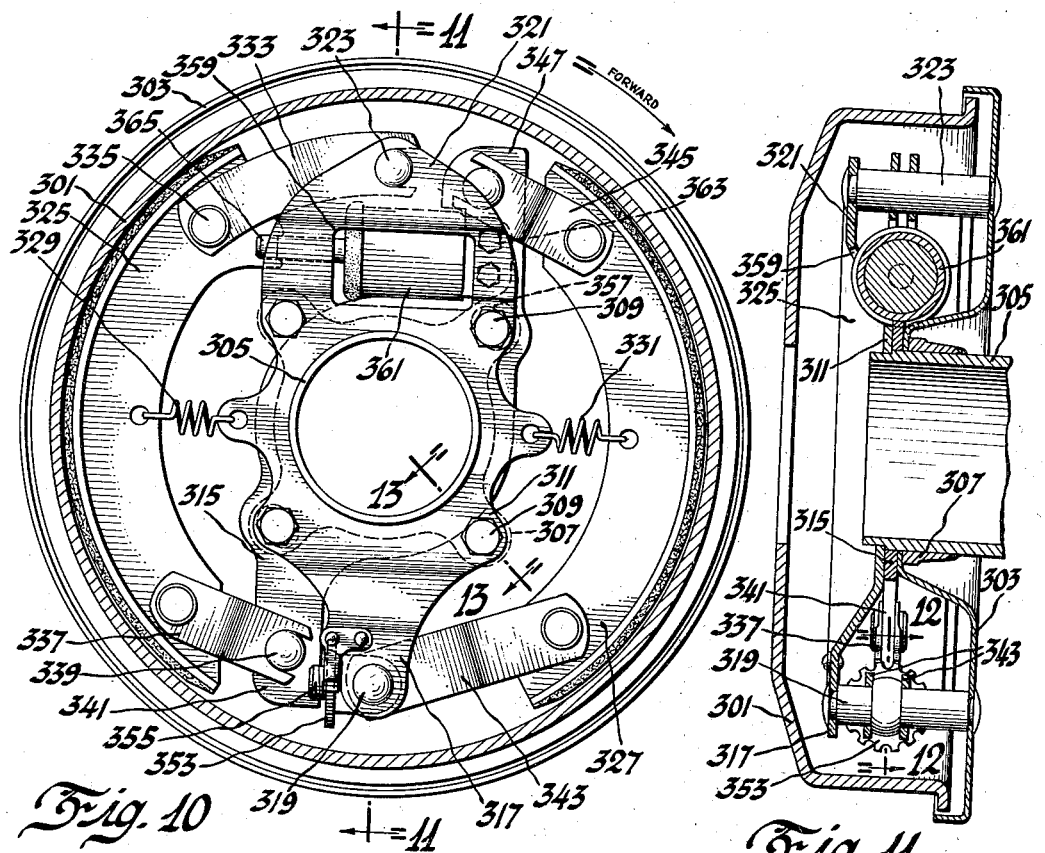
Fig. 10 is a section through the brake drum of a modification.
Fig. 11 is a section on line 11—11 of Fig. 10.

A lever or plate 315 is supported for rotation about housing member 305 between the plates 303 and 311, the thickness of the lever being less than that of washers 313 to prevent binding. Plate 311 extends radially as at 317 in one part of its periphery. An anchor pin 319 is carried by cover plate 303 and extension 317 as seen by Fig. 11. Another and diametrically opposite extension 321 of plate 311 similarly cooperates with cover plate 303 to support another anchor pin 323.

Within the drum are shoes 325 and 327 normally held from drum contact by springs 329 and 331 connected to the shoes and to the plate 311.

Articulating linkage 333 is pivoted to shoe 325 at 335 and has a slotted engagement with anchor pin 323. Applying link means 337 connects shoe 325 to a pin 339 carried by the extended end 341 of lever 315. Articulating linkage 343 between shoe 327 and anchor pin 319 resembles linkage 333. An applying link 345 between shoe 327 and an opposite extension 347 of lever 315 corresponds with applying link 337 for shoe 325.

Figure 12:
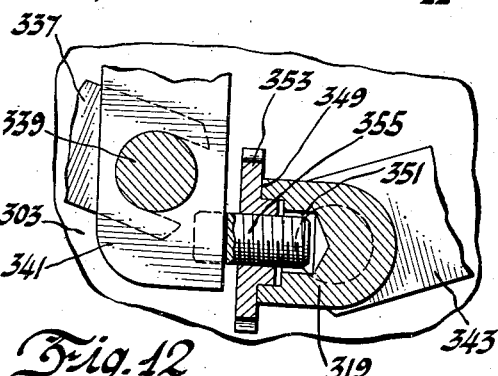
Fig. 12 is a section on line 12—12 of Fig. 11.
Figure 13:
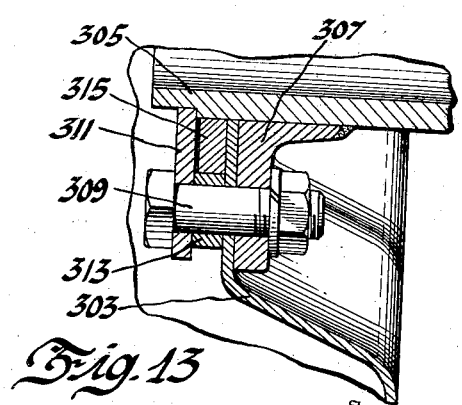
Fig. 13 is a section on line 13—13 of Fig. 10.
Figure 14:
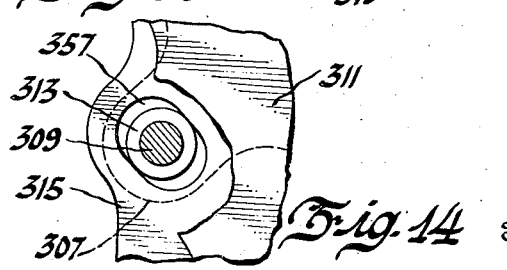
Fig. 14 is a detail according to Fig. 10, partly broken away.

Anchor pin 319 is of special form. Between its ends it has a flat face 349 recessed as at 351. A nut 353 is adapted to engage this face. The nut is centered by an integral projection fitting the recess as shown by Fig. 12. The nut is threaded on a screw threaded stem 355, one end of which freely enters recess 351. The other end is bifurcated to engage the side faces of the lever extension 341. The periphery of the nut is formed with teeth to effect adjustment of the lever and shoes. To permit the rotary movement, the lever is provided with slots 357 embracing such of the pins 309 as are located within the marginal wall thereof.

An opening 359 is formed within plate 311 to accommodate the wheel cylinder 361 of a hydraulic brake system. This cylinder is secured by fastening means 363 to lever 315, its piston element 365 engaging shoe 325.

When hydraulic medium is forced into cylinder 361 and the vehicle is traveling forward (see arrow in Fig. 10) the cylinder tends to move to the right and rock lever 315 clockwise. This applied actuating force is supplemented by the self-energizing force and both shoes are applied, turning about their anchor pins 319 and 323. When the vehicle is in reverse and the brake is applied, the self-energizing force is applied to the lever through links 337 and 345, overcoming the tendency of the power cylinder to move and rock the lever. Shoe 325 is therefore rocked about anchorage 339 to check the rotation of the drum 301 and the vehicle. If the same arrangement is used on each wheel there will be eight shoes to check forward travel and but four only to check rearward travel. It will be seen that this form of the invention uses but a single lever and lessens the cost. In many installations it will afford all the braking needed.

We claim:

1. A brake comprising a drum, a pair of shoes within and adapted to engage said drum, first and second plates within said drum, means to mount both said plates for rotation, a fixed anchor member, the first plate having an arm adapted to engage a first face of said anchor member and the second plate having an arm adapted to engage a second face of said anchor member, floating brake applying means having two oppositely movable elements, the first plate having a projection adapted to be moved by a first one of said elements and the second plate having a projection adapted to be moved by the second of said elements and links connecting the ends of each of said shoes to both plates one to the first plate, the other end to the second plate.

2. The invention defined by claim 1, one of the anchoring faces of said anchor member being adjustable.

3. The invention defined by claim 1, the link connected to one end of each shoe having a second relatively movable frictional connection with its shoe.

4. The invention defined by claim 1 together with yielding means connected to the said plates to rotate them in opposite directions whereby the first plate engages one face and the other plate engages the other face of the anchor member.

5. The invention defined by claim 1, one of the abutment faces of said anchor member being axially movable, and a floating cam constituting a second brake applying member and positioned between said movable face and one of the plate arms.

6. Brake mechanism comprising a drum, a pair of shoes disposed within said drum, a plurality of plates having diametrically opposed arms, said plates being mounted for rotation about the axis of said drum, connecting means between the ends of each shoe and the adjacent plate arm, floating means to spread apart one pair of adjacent arms on said plates, anchor means having opposed surfaces and positioned between the other pair of adjacent ends of said plates, one only of said surfaces being adjustable whereby a single adjustment is effective for both shoes.

7. Brake mechanism comprising a drum, plates rotatably mounted about the axis of said drum, oppositely disposed shoes adapted to engage said drum, each shoe having end connections to the two plates, floating brake applying means having relatively movable parts located between one pair of adjacent ends of said shoes, said parts being operable on said plates, anchor means between the second pair of adjacent ends, said anchor means having opposed faces to engage the two plates, respectively, one of said faces serving as a stop for one direction of drum rotation, the other face serving as a stop for the other direction of drum rotation.

8. The invention defined by claim 7, one only of said faces being adjustable.

9. The invention defined by claim 7, said brake applying means comprising a cylinder and piston, said cylinder and piston engaging said plates.

10. The invention defined by claim 7, one of said faces being adjustable together with a floating brake applying cam between said adjustable face and one of said plates.

11. The invention defined by claim 7 together with yielding means operable on said plates to hold them in contact with said stops.

12. A brake comprising a drum, two shoes within and adapted to engage said drum applying means therefor between one pair of adjacent ends thereof, an anchor adjacent the opposite pair of adjacent ends, floating means rotatable about the axis of said drum to and from contact with said anchor, means connecting said floating means and shoes whereby at least one of said shoes operates as a self-energizing shoe for both directions of drum rotation.

13. A brake comprising a drum, two shoes to engage the drum, applying means between a first pair of adjacent shoe ends, anchors for said shoes between both pairs of adjacent shoe ends, floating means mounted to rotate to and from contact with one of said anchors, articulating linkage between the second pair of adjacent shoe ends and one of said anchors and the floating means, respectively, and articulating linkage between the other pair of adjacent ends and said other anchor and the floating means, respectively.

14. The invention defined by claim 13 together with a second floating means carrying said other anchor and constituting a part of the articulating linkage between one of said first mentioned pair of shoe ends and its anchor.

OLAF RASMUSSEN.
GILBERT K. HAUSE.